United States Patent
Okamoto et al.

(10) Patent No.: US 7,740,776 B2
(45) Date of Patent: Jun. 22, 2010

(54) METHOD FOR FOAM INJECTION MOLDING OF THERMOPLASTIC RESIN

(75) Inventors: Akio Okamoto, Sanyouonoda (JP); Kazuaki Miyamoto, Ube (JP)

(73) Assignee: Ube Machinery Corporation, Ltd., Ube-shi (JP)

( * ) Notice: Subject to any disclaimer, the term of this patent is extended or adjusted under 35 U.S.C. 154(b) by 80 days.

(21) Appl. No.: 11/990,782

(22) PCT Filed: Aug. 23, 2006

(86) PCT No.: PCT/JP2006/316507
§ 371 (c)(1), (2), (4) Date: Feb. 21, 2008

(87) PCT Pub. No.: WO2007/023859
PCT Pub. Date: Mar. 1, 2007

(65) Prior Publication Data
US 2009/0134541 A1    May 28, 2009

(30) Foreign Application Priority Data
Aug. 23, 2005   (JP)   ............................. 2005-240731

(51) Int. Cl.
*B29C 44/42*   (2006.01)
*B29C 45/07*   (2006.01)
(52) U.S. Cl. .................... 264/50; 264/55; 264/328.7; 264/328.18
(58) Field of Classification Search ............... 264/55, 264/40.5, 41, 45.2, 49, 50, 51, 54, 328.7, 264/328.17, 328.18
See application file for complete search history.

(56) References Cited

U.S. PATENT DOCUMENTS

| 3,801,686 | A | * | 4/1974 | Kyritsis et al. ............... 264/51 |
| 3,883,629 | A | * | 5/1975 | Garner et al. ............... 264/55 |
| 4,133,858 | A | * | 1/1979 | Hayakawa et al. ........... 264/54 |

(Continued)

FOREIGN PATENT DOCUMENTS

CA        2237064 A1   11/1998

(Continued)

OTHER PUBLICATIONS

Office Action mailed Oct. 1, 2009, issued on the corresponding Canadian Patent Application No. 2,618,845.

*Primary Examiner*—Joseph S Del Sole
*Assistant Examiner*—Ryan Ochylski
(74) *Attorney, Agent, or Firm*—Edwards Angell Palmer & Dodge LLP

(57) ABSTRACT

A method for injection foaming molding of a thermoplastic resin includes the steps of (1) injecting the foaming-agent-containing plasticized resin from an injection apparatus 30 to fill a mold cavity 10*a*, (2) releasing a clamping force of a mold 10 immediately after the foaming-agent-containing plasticized resin is injected and filled into the mold cavity 10*a*, so as to release the pressure of the foaming-agent-containing plasticized resin in the mold cavity 10*a*, (3) maintaining the pressure-released state of the foaming-agent-containing plasticized resin in the mold cavity 10*a* for a predetermined period of time, (4) expanding the mold cavity 10*a* to foam the foaming-agent-containing plasticized resin, and (5) cooling and maintaining the foaming-agent-containing plasticized resin while the mold cavity 10*a* is in the expanded state.

5 Claims, 2 Drawing Sheets

U.S. PATENT DOCUMENTS

| | | | |
|---|---|---|---|
| 4,783,292 A * | 11/1988 | Rogers | 264/40.6 |
| 5,334,356 A | 8/1994 | Baldwin et al. | |
| 6,010,656 A * | 1/2000 | Nomura et al. | 264/255 |
| 6,328,916 B1 * | 12/2001 | Nishikawa et al. | 264/53 |
| 6,358,446 B1 * | 3/2002 | Clarke | 264/50 |
| 6,623,838 B1 * | 9/2003 | Nomura et al. | 428/167 |
| 6,893,587 B2 * | 5/2005 | Murakoshi et al. | 264/45.5 |
| 2002/0145214 A1 * | 10/2002 | Murakoshi et al. | 264/45.5 |
| 2005/0003032 A1 * | 1/2005 | Sugihara et al. | 425/4 R |
| 2005/0230861 A1 * | 10/2005 | Takatori et al. | 264/41 |
| 2007/0267772 A1 * | 11/2007 | Fischer et al. | 264/50 |
| 2009/0140447 A1 * | 6/2009 | Kawamura et al. | 264/51 |

FOREIGN PATENT DOCUMENTS

| | | | |
|---|---|---|---|
| CA | 2477149 A1 | | 9/2003 |
| JP | 43-9913 | | 4/1968 |
| JP | 44-6080 | | 3/1969 |
| JP | 06-506724 | | 7/1994 |
| JP | 3091611 | | 4/1995 |
| JP | 7088878 | * | 4/1995 |
| JP | 2002079545 | * | 3/2002 |
| JP | 2004009518 | * | 6/2002 |
| JP | 2002-283423 | | 10/2002 |
| JP | 2004-009518 | | 1/2004 |
| WO | WO2006011415 | * | 2/2006 |

* cited by examiner

METHOD FOR FOAM INJECTION MOLDING OF THERMOPLASTIC RESIN

TECHNICAL FIELD

The present invention relates to a method for injection foaming molding of a thermoplastic resin. In particular, the present invention relates to a method for injection foaming molding of a thermoplastic resin, wherein an injection-molded foam product having desired bubble diameter and density and exhibiting good surface state can be produced simply, safely, and efficiently.

BACKGROUND ART

Molded foam products, in which many bubbles are present in the inside of resins, are used in various fields because excellent physical properties such as lightweight properties, heat insulating properties, sound absorbing properties, and rigidity on a unit mass basis, are exhibited. Particularly in recent years, weight reduction has been highly valued because the weight reduction leads directly to reduction of the raw material cost, the transportation cost, and the like. Therefore, application fields of molded foam products have been further expanded. Methods for foam-molding resins are classified into a physical foaming method and a chemical foaming method depending on the type of foaming agent to be blended into the resin. In the physical foaming method, inert gases such as nitrogen and carbon dioxide and volatile substances such as hydrocarbons and fluorocarbons, which are physical foaming agents, are used. On the other hand, in the chemical foaming method, organic foaming agents such as azo compounds and nitroso compounds and inorganic foaming agents such as sodium bicarbonate, which are chemical foaming agents, are used. In a injection foaming molding method, in which the above-described foaming method is applied to an injection molding method serving as a method for molding a resin, a foaming-agent-containing molten resin, in which a foaming agent and the resin have been mixed, is injected and filled into a mold cavity and the resin is foamed, so that an injection-molded foam product having a bubble diameter of about 80 to 300 μm in the inside of the molded product can be produced.

For the method for foam-molding a resin, for example, a molding method in which a chemical foaming agent or a physical foaming agent is blended into an olefin resin, the resulting mixture is melted, and a molded foam product including bubbles in the inside of the molded product is produced by using a short-shot method (low-pressure method), is disclosed (refer to Patent Document 1). In the method disclosed in Patent Document 1, a molding apparatus is composed of an extruder, an accumulator, and a mold. A foaming-agent-containing molten resin prepared by mixing a physical foaming agent, which is an inert gas such as a nitrogen gas; a volatile substance such as a hydrocarbon or a fluorocarbon; or the like, or a chemical foaming agent and a resin is fed into the accumulator with the extruder, the foaming-agent-containing molten resin fed into the accumulator is injected into the mold, and the resin is foamed so as to produce an injection-molded foam product including bubbles in the inside of the molded product.

On the other hand, for the method for producing a molded foam product by using a physical foaming agent, for example, a method, in which a gas such as air; a volatile substance; or the like is supplied from an extruder hopper under a pressure concurrently with supply of a resin, and melting of the resin and inclusion and dispersion of bubbles are performed with a screw extruder, is disclosed (refer to Patent Document 2). In the method disclosed in Patent Document 2, a polyethylene is used, and air is supplied at a pressure of about 0.69 to 0.78 MPa (7 to 8 kgf/cm$^2$) so as to produce an extrusion-molded product of spongy substance including isolated bubbles.

For example, a method, in which a bubble density (the number of bubbles per unit area) is significantly increased as compared with the density of bubbles formed in the inside of a molded foam product by using a known chemical foaming agent or a physical foaming agent, is disclosed (refer to Patent Document 3) as a method in which carbon dioxide that is an inert gas serving as a blister gas is used in a supercritical state so as to produce a molded foam product. In the method disclosed in Patent Document 3, a system composed of a pressurizer for a supercritical fluid, an apparatus for supplying the supercritical fluid, and a gas bomb is attached to a molding apparatus, carbon dioxide in a supercritical state is infused from a plasticizing cylinder of the molding apparatus so as to dissolve into a molten resin, the molten resin, in which infused carbon dioxide is dissolved, is injected and filled into a mold, and the resin is foamed so as to produce a molded resin product having ultrafine microporosity of below 1 μm, which is referred to as microcell, in the inside of the molded product.

Patent Document 1: JP-A-S44-006080
Patent Document 2: JP-A-S43-009913
Patent Document 3: JP-K-H06-506724

DISCLOSURE OF INVENTION

However, the methods disclosed in the above-described Patent Documents 1 to 3 have the following problems. The method disclosed in Patent Document 1 has a problem in that when the resin and the organic chemical foaming agent such as an azo compound or a nitroso compound are supplied and molded, corrosive ammonia, carbon monoxide, steam, cyanic acid, isocyanic acid, and the like are generated as decomposition products due to thermal decomposition, these decomposition products are released into the air and, in addition, the decomposition products remain in the products. In the case where molding is performed by supplying volatile substances such as hydrocarbons or fluorocarbons, which are physical foaming agents not generating a decomposition product, there is a problem in that emission of the volatile substances into the air is regulated because the volatile substances are environmental pollution and environmental disruption substances. The method disclosed in Patent Document 2 has a problem in that the gas is not finely dispersed in the foaming-agent-containing molten resin and, thereby, it is difficult to obtain a molded foam product having desired bubble density and bubble diameter. The method disclosed in Patent Document 3 has a problem in that an apparatus for generating the supercritical fluid and an apparatus for supplying the supercritical fluid are required, these apparatuses are regulated by the law because a high pressure gas is treated in these apparatuses, and introduction and handling of facilities become complicated. Furthermore, there are problems in that the state of a skin layer, and by extension the state of product surface do not always become good.

The present invention has been made in consideration of the above-described problems in the known technologies. Accordingly, it is an object of the present invention to provide a method for injection foaming molding of a thermoplastic resin, wherein an injection-molded foam product having desired bubble diameter and density and exhibiting good surface state can be obtained simply, safely, and efficiently. Furthermore, it is another object to provide a method for injection foaming molding of a thermoplastic resin which has a low impact on the environment.

The present invention has been made to achieve the above-described objects, and the following method for injection foaming molding of a thermoplastic resin is provided by the present invention.

[1] A method for injection foaming molding of a thermoplastic resin to foam-mold a foaming-agent-containing plasticized resin, in which a foaming agent is blended into a plasticized thermoplastic resin, by using an injection apparatus for injecting the foaming-agent-containing plasticized resin and a mold, in which the foaming-agent-containing plasticized resin injected from the above-described injection apparatus is filled into a mold cavity with a variable volume and by expanding the above-described mold cavity filled with the above-described foaming-agent-containing plasticized resin, the method characterized by comprising the following steps (1) to (5):

(1) injecting the above-described foaming-agent-containing plasticized resin from the above-described injection apparatus to fill the above-described mold cavity in a mold-clamped state, (2) releasing a clamping force of the above-described mold immediately after the above-described foaming-agent-containing plasticized resin is injected and filled into the above-described mold cavity, so as to release the pressure of the above-described foaming-agent-containing plasticized resin in the above-described mold cavity, (3) maintaining the pressure-released state of the above-described foaming-agent-containing plasticized resin in the above-described mold cavity for a predetermined period of time, (4) expanding the above-described mold cavity to foam the above-described foaming-agent-containing plasticized resin, and (5) cooling and maintaining the above-described foaming-agent-containing plasticized resin while the above-described mold cavity is in the expanded state.

[2] The method for injection foaming molding of a thermoplastic resin according to the above-described item [1], wherein the rate of releasing the clamping force of the above-described mold (clamping force releasing rate) in the above-described step (2) is specified to be 1,000 to 20,000 KN/sec.

[3] The method for injection foaming molding of a thermoplastic resin according to the above-described item [1] or item [2], wherein the predetermined period of time for maintaining the clamping-force-released state of the above-described mold (clamping-force-released state maintenance time) in the above-described step (3) is specified to be 0.1 to 10 seconds.

[4] The method for injection foaming molding of a thermoplastic resin according to any one of the above-described items [1] to [3], wherein the rate of expanding the above-described mold cavity (expansion rate) in the above-described step (4) is specified to be 0.01 to 10 mm/sec.

[5] The method for injection foaming molding of a thermoplastic resin according to any one of the above-described items [1] to [4], wherein the above-described foaming agent is blended into the above-described thermoplastic resin by using a foaming gas as the above-described foaming agent and supplying the above-described foaming gas into the above-described injection apparatus at a pressure of 0.1 MPa or more, and below 1.0 MPa so as to allow the above-described foaming gas to contact with the above-described thermoplastic resin, which is present in the above-described injection apparatus and which is before plasticization or after plasticization.

According to the present invention, a method for injection foaming molding of a thermoplastic resin is provided, wherein an injection-molded foam product having desired bubble diameter and density and exhibiting good surface state can be obtained simply, safely, and efficiently. Furthermore, a method for injection foaming molding of a thermoplastic resin which has a low impact on the environment is provided.

REFERENCE NUMERALS

Figure 1:
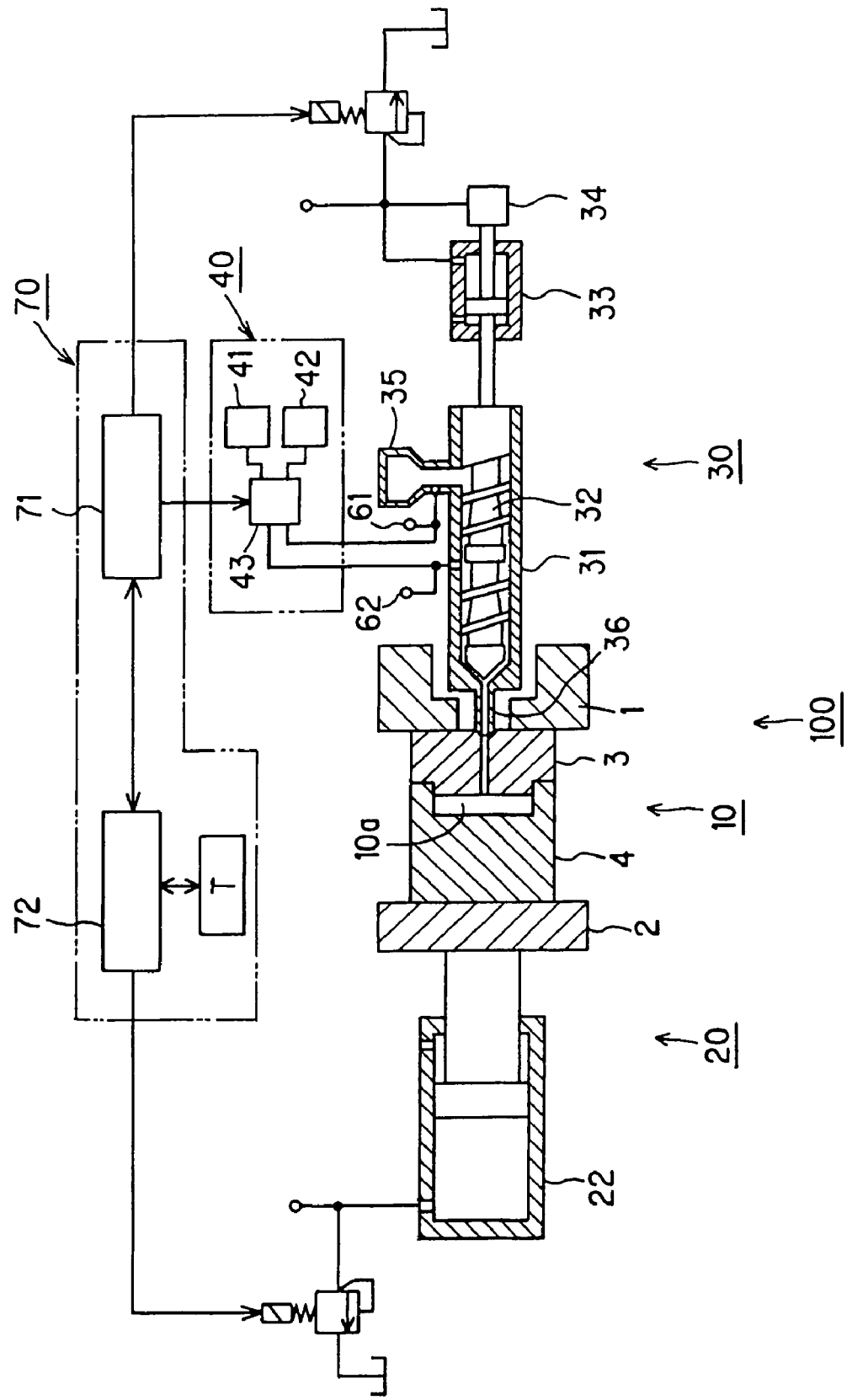
FIG. 1 is an explanatory diagram schematically showing the entire configuration of an embodiment of a horizontal clamping type injection molding apparatus used in a method for injection foaming molding of a thermoplastic resin according to the present invention.

1: fixed platen
2: movable platen
3: fixed mold
4: movable mold
10: mold
10a: mold cavity
20: clamping apparatus
30: injection apparatus
31: plasticizing cylinder
32: screw
33: screw movement device
34: screw rotation device
35: hopper
36: nozzle
40: foaming gas supply device
41: air supply source
42: carbon dioxide supply source
43: foaming gas supply apparatus
45: air compressor
46: pressure control valve
47: check valve
48: pressure gauge
51: carbon dioxide bomb
52: pressure control valve
54: pressure gauge
55: check valve
56: on-off valve
57: on-off valve
58: solenoid directional control valve
59: solenoid directional control valve
61: bubble-core-forming agent supply apparatus
62: bubble-core-forming agent supply apparatus
70: controlling apparatus
71: injection control portion
72: clamping control portion
100: horizontal clamping type injection molding apparatus

BEST MODE FOR CARRYING OUT THE INVENTION

The best mode for carrying out the present invention will be specifically described below with reference to the drawings.

Figure 2:
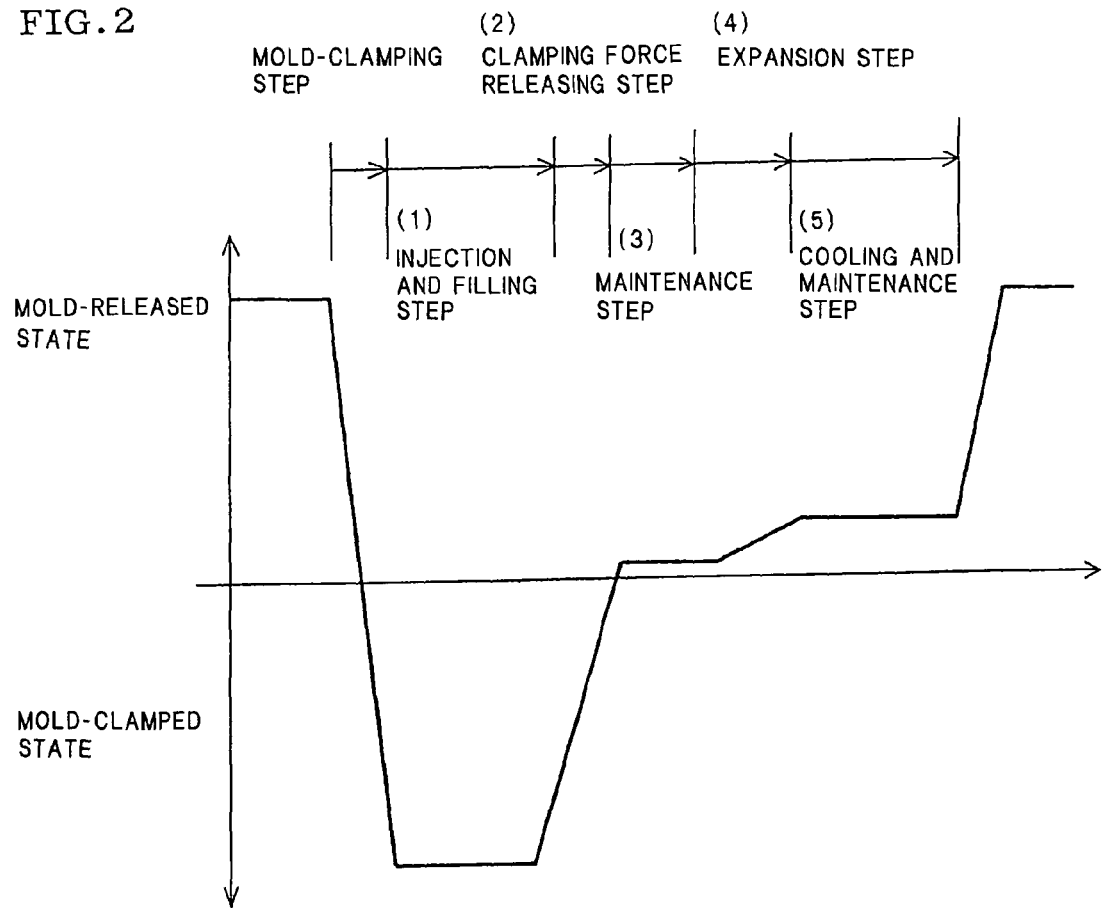
FIG. 2 is a graph schematically showing the magnitude of pressure in each step (from a mold-released state to a mold-clamped state), the pressure being applied to a mold used in the embodiment of the injection molding apparatus shown in FIG. 1.

FIG. 1 is an explanatory diagram schematically showing the entire configuration of an embodiment of a horizontal clamping type injection molding apparatus used in a method for injection foaming molding of a thermoplastic resin according to the present invention. FIG. 2 is a graph schematically showing the magnitude of pressure in each step (from a mold-released state to a mold-clamped state), the pressure being applied to a mold used in the embodiment of the injection molding apparatus shown in FIG. 1.

As shown in FIG. 1, the method for injection foaming molding of a thermoplastic resin according to the present invention is to foam-mold a foaming-agent-containing plasticized resin, in which a foaming agent is blended into a plasticized thermoplastic resin, by using an injection apparatus 30 for injecting the foaming-agent-containing plasticized resin and a mold 10, in which the foaming-agent-containing plasticized resin injected from the injection apparatus 30 is filled into a mold cavity 10a with a variable volume and by expanding the mold cavity 10a filled with the foaming-agent-containing plasticized resin, and the method is characterized by including the following steps (1) to (5).

(1) The step of injecting the foaming-agent-containing plasticized resin from the injection apparatus 30 to fill the mold cavity 10a in a mold-clamped state (Step (1)), (2) The step of releasing a clamping force of the mold 10 immediately after the foaming-agent-containing plasticized resin is injected and filled into the mold cavity 10a, so as to release the pressure of the foaming-agent-containing plasticized resin in the mold cavity 10a (Step (2)), (3) The step of maintaining the pressure-released state of the foaming-agent-containing plasticized resin in the mold cavity 10a for a predetermined period of time (Step (3)), (4) The step of expanding the mold cavity 10a to foam the foaming-agent-containing plasticized resin (Step (4)), and (5) The step of cooling and maintaining the foaming-agent-containing plasticized resin while the mold cavity 10a is in the expanded state (Step (5)).

Each step will be specifically described below.

(Step (1))

In Step (1), the foaming-agent-containing plasticized resin is injected from the injection apparatus 30 and filled into the mold cavity 10a in a mold-clamped state. Examples of methods for preparing the foaming-agent-containing plasticized resin in Step (1) can include a method in which a mixture of a bubble-core-forming agent and a foaming gas is used as a foaming agent, and this mixture is supplied to a supply portion (hopper) 35 or plasticizing portions (plasticizing cylinder and screw) 31 and 32 usually at a pressure of 0.1 MPa or more and below 1.0 MPa, and preferably 0.5 to 0.9 MPa. If the supply pressure of the mixture (foaming gas) is below 0.1 MPa, desired bubble density and bubble diameter cannot be obtained. If the supply pressure is 1.0 MPa or more, foam cells may become coarse, irregularities may occur, for example, large differences in foaming magnification may occur depending on sites of the molded product, and the appearance of the molded product becomes significantly poor due to swirl marks. Since the supply pressure of the mixture (foaming gas) is specified to be 0.1 MPa or more and below 1.0 MPa, the known apparatus for generating the supercritical fluid and the known apparatus for supplying the supercritical fluid are not required, while these apparatuses are necessary for using a foaming gas in a supercritical state.

Preferably, the mixture or the foaming gas is supplied to the supply portion (hopper) 35 or plasticizing portions (plasticizing cylinder and screw) 31 and 32 of the injection apparatus 30 while the supply pressure is controlled (in FIG. 1, a controlling apparatus 70 is shown). The controlling apparatus 70 will be described later.

Examples of thermoplastic resins to be used in the present invention can include styrene based resins such as polystyrene resins, AS resins, and ABS resins; olefinic resins such as polyethylene resins and polypropylene resins; polyester resins such as polyethylene terephthalate resins and polybutylene terephthalate resins; polyacetal resins; polycarbonate resins; modified polyphenylene ether resins; and olefinic thermoplastic elastomers. These resins may be used alone or a mixture of at least two types thereof may be used depending on applications and the like. These thermoplastic resins may be used after being mixed with various additives such as a plasticizer, a release agent, an antistatic agent, a flame retardant, and a foaming agent; various fillers, glass fibers, carbon fibers, and the like for improving physical properties; and a colorant, a dye, and the like, if necessary.

Examples of suitable foaming gases to be used in the present invention can include air, a carbon dioxide gas, a nitrogen gas, or mixed gases thereof. particularly, air or the carbon dioxide gas are more preferable from the viewpoint of the properties of the resulting molded product. It is preferable that the oxidation resistance of the resin is taken into consideration in the selection of these foaming gases. Preferably, a gas other than air is used for a resin having an easily oxidizable group as a part thereof. For example, preferably, air is used for resins such as polypropylene resins, which present no problem with respect to the oxidation resistance, from the viewpoint of ease of availability. Furthermore, an injection-molded foam product of the thermoplastic resin, having desired bubble density and bubble diameter and not containing residual harmful decomposition product, can be produced simply, safely, and efficiently without using a foaming agent harmful to the environment (applying a heavy load to the environment) nor apparatuses for generating and supplying the supercritical fluid, while introduction and handling of the apparatuses are complicated and are regulated by the law, by injecting the foaming gas at 0.1 MPa or more, and below 1.0 MPa.

Examples of bubble-core-forming agents can include inorganic fine powders such as iron oxide, calcium silicate, aluminum silicate, glass fiber, talc, sodium hydrogen carbonate (sodium bicarbonate); metal salts of organic acids such as zinc stearate and magnesium stearate; and organic acids such as citric acid and tartaric acid. These bubble-core-forming agents may be used alone or in combination of at least two types. The bubble-core-forming agent in the state of being mixed into the resin in advance may be supplied to the injection apparatus. Alternatively, the bubble-core-forming agents in the state of mixed gas together with the foaming gas may be supplied.

The supply place of the mixture or the foaming gas to the injection apparatus is specified to be the supply portion (hopper) 35 or the plasticizing portions (plasticizing cylinder and screw) 31 and 32 (for example, in the foaming-agent-containing molten resin) of the injection apparatus 30. Therefore, the foaming gas and the bubble-core-forming agent can be sufficiently dispersed and mixed into the foaming-agent-containing molten resin. Furthermore, in the case where the mixture or the foaming gas is supplied to the plasticizing portions (plasticizing cylinder and screw) 31 and 32 of the injection apparatus 30, it is preferable that the screw disposed in the plasticizing portions (plasticizing cylinder and screw) 31 and 32 is specified to be a two-stage screw because the foaming gas and the bubble-core-forming agent can be further reliably dispersed and mixed into the plasticized resin. It is preferable that the screw 32 is provided with a high-dispersion screw head from the viewpoint of improving the dispersibility and mixing property of the plasticized resin with the foaming gas and the bubble-core-forming agent.

(Step (2))

In Step (2), the clamping force of the mold 10 is released immediately after the foaming-agent-containing plasticized resin is injected and filled into the mold cavity 10a, so as to release the pressure of the foaming-agent-containing plasticized resin in the mold cavity 10a. In Step (2), since the clamping force of the mold 10 is released immediately after the injection and filling, so as to release the pressure of the foaming-agent-containing plasticized resin in the mold cavity 10a, the number of formation of foaming cores serving as starting points of foam cells (the number of foaming cores) increases and aggregation of fine foam cells and high-magnification foaming become possible, as compared with a known method in which the injection and filling are performed, the constant pressure is maintained for a predetermined period of time and, thereafter, the clamping force of the mold 10a is released or a method in which the pressure releasing rate is adjusted in several ways. Since the number of foaming cores increases in proportion to the pressure reduction rate, it is preferable to set the clamping force releasing rate at a high level. Consequently, the application range of the thermoplastic resin to be used is enlarged, and a molded product excellent in both high strength and weight reduction can be produced. Here, preferably, the rate of releasing the clamping force of the mold 10 (clamping force releasing rate) is specified to be 1,000 to 20,000 KN/sec. If the rate is below 1,000 KN/sec, the number of foaming cores becomes small and may become in sufficient. If the rate exceeds 20,000 KN/sec, the increase in the number of foaming cores indicates a downward trend and problems such as shock, may occur in the apparatus.

(Step (3))

In Step (3), the pressure-released state of the foaming-agent-containing plasticized resin in the mold cavity 10a is maintained for a predetermined period of time. In Step (3), since the pressure-released state is maintained for a predetermined period of time, the thickness of a skin layer can be adjusted easily. In addition, the balance between the resin extension viscosity and the foaming expansion force of the foaming-agent-containing plasticized resin can be adjusted easily. Consequently, a skin layer and, by extension a molded product exhibiting good surface state can be produced. Here, it is preferable that the period of time for maintaining the pressure-released state (clamping-force-released state maintenance time) is specified to be 0.1 to 10 seconds. If the time is below 0.1 seconds, the adjustment of the thickness of skin layer becomes insufficient and, in addition, the balance between the resin extension viscosity and the foaming expansion force of the foaming-agent-containing plasticized resin may come undone. If the time exceeds 10 seconds, foaming may becomes difficult because cooling and solidification of the resin proceed excessively.

(Step (4))

In Step (4), the mold cavity 10a is expanded to foam the foaming-agent-containing plasticized resin. Here, preferably, the rate of expanding the mold cavity 10a (expansion rate) is set in consideration of the balance between the resin extension viscosity and the foaming expansion force and is specified to be 0.01 to 10 mm/sec. If the rate is below 0.01 mm/sec, it may become difficult to obtain desired bubble cell diameter and bubble density. If the rate exceeds 10 mm/sec, the balance between the resin extension viscosity and the foaming expansion force may come undone, so that the bubble cells may become coarse. A method for expanding the mold cavity 10a will be described later.

(Step (5))

In Step (5), the foaming-agent-containing plasticized resin is cooled and maintained while the mold cavity 10a is in the expanded state. In Step (5), since the foaming-agent-containing plasticized resin is cooled and maintained while the mold cavity 10a is in the expanded state, the state of desired bubble cell diameter and bubble density can be cooled and solidified. Here, the period of time for cooling and maintaining the foaming-agent-containing plasticized resin (cooling and maintenance time) is set at a period of time longer than or equal to the period of time required until the molded product becomes in a state of not expanding (secondary expansion) any more when the mold is opened and the molded product is taken out.

An embodiment of a horizontal clamping type injection molding apparatus, as shown in FIG. 1, used in the present invention will be specifically described below. The horizontal clamping type injection molding apparatus 100 used in the present invention is composed of a mold 10, a clamping apparatus 20, an injection apparatus 30, a foaming gas supply device 40, and a controlling apparatus 70.

The mold 10 is composed of a fixed mold 3 attached to a fixed platen 1 and a movable mold 4 attached to a movable platen 2. The fixed mold 3 and the movable mold 4 constitute a semi-positive structure and are fitted to each other in a fitting portion. A cavity surface formed in the fixed mold 3 and a cavity surface formed in the movable mold 4 in the fitted state are combined to form a mold cavity 10a. The fitting portion of the semi-positive structure is formed around the entire perimeter of the mold cavity 10a and prevents the resin filled in the mold cavity 10a from leaking out of the mold 10 even when the mold cavity 10a is expanded after injection and filling.

The clamping apparatus 20 is provided with a clamping cylinder 22 which effects mold-releasing and mold-clamping of the mold 10. The movable mold 4 is configured to be able to move backward and forward relative to the fixed mold 3 under the guidance of a tie bar (not shown in the drawing) in such a way that the volume of the mold cavity 10a can be expanded or contracted.

In the embodiment of the present invention, the mold 10 having the semi-positive structure, in which the resin filled in the mold cavity 10a does not leak even when the mold 10 is opened by a predetermined stroke, is used, although not limited to this. Other molds, for example, a mold having a flash structure, may be used insofar as the mold can be applied to the foam molding. In the present embodiment, the horizontal clamping type injection molding apparatus including a straight hydraulic clamping apparatus is used. However, a toggle type clamping apparatus or an electric servomotor type or vertical clamping type apparatus may be used.

The injection apparatus 30 is provided with a plasticizing cylinder 31, a screw 32 incorporated in the plasticizing cylinder 31 and having flights, and a hopper 35 for supplying a molding material into the plasticizing cylinder 31. A screw movement device 33 for moving the screw 32 backward and forward and a screw rotation device 34 for driving the screw 32 to rotate are disposed. A foaming gas is supplied from a foaming gas supply device 40 into the foaming-agent-containing molten resin in a supply portion (hopper) 35 or plasticizing portions (plasticizing cylinder and screw) 31 and 32. A heater (not shown in the drawing) is attached on the outer perimeter surface of the plasticizing cylinder 31.

The injection apparatus 30 has a configuration in which the pellet-shaped molding material is supplied from the hopper 35 into the plasticizing cylinder 31 by the screw 32 being rotated by the screw rotation device 34. The supplied pellet-shaped molding material is heated by the heater attached to the plasticizing cylinder 31 and undergoes kneading and compression action due to rotation of the screw 32 so as to be melted, while the foaming gas and the bubble-core-forming agent are dispersed and mixed therein, and fed toward the front of the screw 32. The foaming-agent-containing molten resin, which is fed toward the front of the screw 32 and into which the foaming gas and the bubble-core-forming agent are dispersed and kneaded, can be injected and filled into the mold from a nozzle 36 attached to the end of the plasticizing cylinder 31 by the screw 32 being moved forward by the screw movement device 33. In the case where a fine powder of at least one type of inorganic substance selected from the group consisting of iron oxide, calcium silicate, zinc stearate, and magnesium stearate is used as the bubble-core-forming agent, an appropriate amount based on the predetermined molding condition can be supplied from bubble-core-forming agent supply apparatuses 61 and 62 described later.

In the injection apparatus 30 of the present embodiment, the screw movement device 33 is specified to be the hydraulic cylinder and the screw rotation device 34 is specified to be the hydraulic motor, although not limited to them. A screw movement device and a screw rotation device by using electric servomotors may also be used. The configuration of the present embodiment includes the inline screw type injection apparatus in which plasticization and injection are performed with a single screw. However, a preplasticization type injection apparatus may be used in which the plasticization and the injection are performed with separate mechanisms. Furthermore, in the present embodiment, the form of the screw 32 is specified to be the two-stage screw. However, for example, in the case where the supply point of the foaming gas is specified to be the hopper 35, a single-stage screw may be used.

The foaming gas supply device 40 is provided with an air supply source 41, a carbon dioxide supply source 42, and a foaming gas supply apparatus 43. The air supply source 41 and the carbon dioxide supply source 42 are connected through a supply path. The foaming gas supply device 40 is provided with foaming gas supply paths connected to gas supply ports disposed in the plasticizing cylinder 31 and the hopper 35 of the injection apparatus 30 and supplies the foaming gas to the injection apparatus 30 on the basis of the command of the controlling apparatus 70. The bubble-core-forming agent supply apparatuses 61 and 62 for supplying the bubble-core-forming agent are disposed in the vicinity of the ends of the supply paths connected to the foaming gas supply apparatus 43 and the injection apparatus 30 and are configured to supply a fine powder of at least one type of inorganic substance selected from the group consisting of, for example, iron oxide, calcium silicate, zinc stearate, and magnesium stearate.

Figure 3:
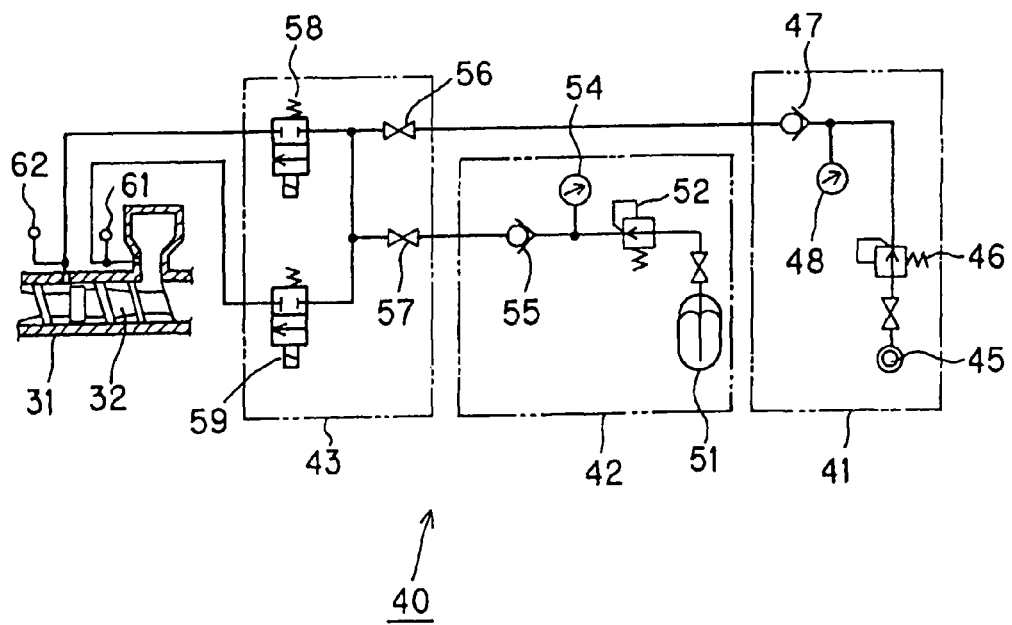
FIG. 3 is an explanatory diagram schematically showing the basic configuration of an example of a foaming gas supply device used in a method for injection foaming molding of a thermoplastic resin according to the present invention.

As shown in FIG. 3, the foaming gas supply device 40 is composed of the air supply source 41, the carbon dioxide supply source 42, and the foaming gas supply apparatus 43. Reference numeral 31 denotes the plasticizing cylinder, reference numeral 32 denotes the screw, and reference numerals 61 and 62 denote the bubble-core-forming agent supply apparatuses for supplying the bubble-core-forming agent into the foaming gas (the same reference numerals as those in FIG. 1 are provided). The air supply source 41 is provided with an air compressor 45, a pressure control valve 46, a check valve 47, and a pressure gauge 48. The carbon dioxide supply source 42 is provided with a carbon dioxide bomb 51, a pressure control valve 52, a pressure gauge 54, and a check valve 55. The foaming gas supply apparatus 43 is provided with on-off valves 56 and 57, and solenoid directional control valves 58 and 59.

The air supply source 41 is configured to reduce the pressure of the air, which has been compressed with the air compressor 45, with the pressure control valve 46 and supply the resulting air to the foaming gas supply apparatus 43 through the check valve 47. The air supplied to the foaming gas supply apparatus 43 can be fed through the on-off valve 56 and the solenoid directional control valves 58 and 59 into the injection molding apparatus 30 from the plasticizing cylinder 31 and/or the hopper 35. When the on-off valve 56 is opened, the air decompressed by the pressure control valve 46 to a predetermined pressure is supplied to the foaming gas supply apparatus 43 through the check valve 47. The air supplied to the foaming gas supply apparatus 43 can be fed into the foaming-agent-containing molten resin through the supply port disposed nearly at the central portion of the plasticizing cylinder 31 by opening the solenoid directional control valve 58 and separately be fed through the gas supply port disposed in the hopper 35 by opening the solenoid directional control valve 59. In the configuration of the embodiment of the present invention, the air compressor 45 is used as the air source. However, in the case where plant air can be used as the air source, the plant air may be decompressed to a predetermined pressure and be joined directly to the foaming gas supply apparatus 43.

On the other hand, the carbon dioxide supply source 42 is configured to reduce the pressure of carbon dioxide in the carbon dioxide bomb 51 with the pressure control valve 52 and supply the resulting carbon dioxide to the foaming gas supply apparatus 43 through the check valve 55. The carbon dioxide supplied to the foaming gas supply apparatus 43 can be fed through the on-off valve 57 and the solenoid directional control valves 58 and 59 into the injection molding apparatus 30 from the plasticizing cylinder 31 and the hopper port. When the on-off valve 57 is opened, the carbon dioxide decompressed by the pressure control valve 52 to a predetermined pressure is supplied to the foaming gas supply apparatus 43 through the check valve 55. The carbon dioxide supplied to the foaming gas supply apparatus 43 can be fed into the molten resin through the supply port disposed nearly at the central portion of the plasticizing cylinder 31 by opening the solenoid directional control valve 58 and separately be fed through the gas supply port disposed in the hopper 35 by opening the solenoid directional control valve 59.

In the case where nitrogen is used as the foaming gas, a nitrogen supply source has the same configuration as that of the carbon dioxide supply source 42 as shown in FIG. 3. In the configuration, the carbon dioxide bomb 51 is replaced with a nitrogen bomb serving as a nitrogen source. Alternatively, for example, the nitrogen supply source is not used, the air supply source 41 may be provided with a nitrogen gas separator having a gas permeable membrane, and nitrogen in the air may be separated and supplied to the air compressor 45.

As shown in FIG. 1, the controlling apparatus 70 is composed of an injection control portion 71 for controlling plasticization of the molding material, supply of the foaming gas and a fine powder of at least one type of inorganic substance selected from the group consisting of iron oxide, calcium silicate, zinc stearate, and magnesium stearate, which serves as the bubble-core-forming agent, and injection of the foaming-agent-containing molten resin into the mold 10; a clamping control portion 72 for controlling the opening and closing of the mold 10 and a clamping force; timers; and the like. The clamping control portion 72 is provided with a portion for setting the movement position and the movement rate of the position of the movable platen 2 in such a way that the volume of the mold cavity 10a becomes a desired volume at the start of the foaming step of the resin. Furthermore, the clamping control portion 72 can control in such a way that the position of the movable platen 2 is maintained until the foaming step is completed. The foaming step includes the step of releasing a clamping force of the mold 10 just after the completion of filling of the resin into the mold cavity 10a (completion of Step (1)) is detected, so as to release the pressure of the foaming-agent-containing plasticized resin in the mold cavity 10a (Step (2)), the step of maintaining the pressure-released state of the foaming-agent-containing plasticized resin in the mold cavity 10a for a predetermined period of time (Step (3)), and the step of expanding the mold cavity 10a to foam the foaming-agent-containing plasticized resin (Step (4)). Finally, the foaming-agent-containing plasticized resin is cooled and maintained while the mold cavity 10a is in the expanded state (Step (5)). A skin layer and foaming cores are formed during performance of these steps. As the rate of reduction of the clamping force increases, the number of formed foaming cores increases. The expansion rate of the mold cavity 10a is set on the basis of the extension viscosity of the molding resin. It is preferable that the expansion rate is set at a low level when the extension viscosity is low and the expansion rate is set at a high level when the extension viscosity is high.

In the present embodiment, in the case where an organic acid such as citric acid or tartaric acid, aluminum silicate, glass fiber, talc, or the like serving as a bubble-core-forming agent and a molding material are mixed and supplied to the injection molding apparatus, a method in which the bubble-core-forming agent is made into the form of a powder and is dry-blended into the molding material, a method in which the bubble-core-forming agent is made into a master batch and is added to the molding material, or the like may be used.

The flow of process in the case where injection molding is performed by using the above-described horizontal clamping type injection molding apparatus 100 will be specifically described below. A pressure oil is supplied to the piston head side of the clamping cylinder 22 shown in FIG. 1 to move a piston rod forward. The movable platen 2 is thereby moved toward the fixed platen 1 so as to mold-clamp the mold 10 and this state is maintained. It is preferable that the clamping force applied to the mold is a minimum value required for preventing the mold 10 from being opened by the filling pressure of the resin during the filling of the resin from the viewpoint of the energy consumption and the life of molding apparatus. After the mold-clamping is completed, the resin is injected and filled into the mold cavity 10a on the basis of predetermined amount of injection and filling, injection pressure, and injection rate.

A pressure oil is supplied to the screw rotation device 34 to rotate the screw 32. The molding material supplied from the hopper 35 is heated by the heater attached to the plasticizing cylinder 31 and undergoes kneading and compression action due to rotation of the screw 32 so as to be melted, while the foaming gas and the bubble-core-forming agent are dispersed and mixed therein, and fed toward the front of the screw 32. The foaming-agent-containing molten resin, which is fed toward the front of the screw 32 and into which the foaming gas and the bubble-core-forming agent are dispersed and mixed, can be injected and filled into the mold cavity 10a by the screw 32 being moved forward by supplying the pressure oil to the screw movement device 33. Immediately after the completion of filling the resin, the pressure oil applied to the piston head side of the clamping cylinder 22 is decompressed to reduce the clamping force, and the resulting state is maintained for a predetermined period of time. Then the pressure oil is supplied to the piston rod side of the clamping cylinder 22 to move the piston rod backward and, thereby, the movable platen 2 is moved in the direction reverse to the fixed platen, the mold 10 is mold-released, and the volume of the mold cavity 10a is expanded. The expansion of the volume of the mold cavity 10a is controlled on the basis of the set value of the portion for setting the movement position and the movement rate of the position of the movable platen 2, the portion being disposed in the clamping control portion 72. The movable platen 2 is stopped at a predetermined position, and the position is maintained in such a way that the movable platen 2 is not pushed back by the resin foaming pressure in the mold. Since the volume of the mold cavity 10a is expanded by performing the expansion control of the mold volume as described above, the resin pressure in the mold cavity 10a starts to decrease, and at the same time, foaming starts to occur in the inside of the resin. After the cooling step in which the volume of the mold cavity 10a is maintained for a predetermined cooling time of the molded product is performed, the mold 10 is moved backward to the position for taking out the molded product, so that the molded foam product can be obtained. In the present embodiment, the fixed mold 3 and the movable mold 4 are fitted to each other in the fitting portion even when the mold 10 is slightly opened. Therefore, the foaming-agent-containing molten resin in the mold cavity 10a does not leak out of the mold 10.

EXAMPLES

The present invention will be further specifically described below with reference to the examples.

Example 1

An all electric toggle type injection molding machine (produced by UBE MACHINERY CORPORATION, LTD., trade name: MD350S-IV-i9.5A/DP, clamping force 3,430 KN, screw diameter 52 mm) was used as the injection molding apparatus, and polypropylene (produced by Prime Polymer Co., Ltd., trade name: automobile interior grade MRF35, including rubber and talc as additives) was used as the thermoplastic resin. A mixture type of sodium bicarbonate and citric acid produced by EIWA CHEMICAL IND. CO., LTD., was used as the bubble-core-forming agent, air was used as the foaming gas, and they were infused into a plasticized resin in a plasticizing cylinder at a pressure of 0.8 MPa. For a plasticizing screw, a two-stage screw equipped with a mixing head at a screw end was used. The molded product was an automobile interior (glove box outer) of 350×220 mm, in which the mold cavity thickness during the filling was 1.8 mm. Regarding the molding condition, the resin temperature was set at 200° C., the mold temperature was set at 40° C., the clamping force was set at 3,430 KN, and the injection rate was set at 250 g/sec. Immediately after the foaming-agent-containing plasticized resin was injected and filled into the mold cavity under the above-described condition, the clamping force of the mold was released at a releasing rate of 1,000 KN/sec. The clamping-force-released state was maintained for 4 seconds as a clamping-force-released state maintenance time. The mold cavity was expanded at an expansion rate of 2 mm/sec. Furthermore, the foaming-agent-containing plasticized resin was cooled and maintained for 35 seconds while the mold cavity was in the expanded state. Regarding the resulting molded foam products, the state of foaming and the state of appearance were evaluated visually, and the plasticization capability (referring to a metering time of the resin in molding) was evaluated on the basis of relative comparison with that in Comparative example 4 described later. The results thereof are shown in Table 1. Regarding the evaluation of the state of foaming, ○ indicates the case where an aggregate of fine foam cells was obtained, Δ indicates the case where an aggregate including coarse cells partly was obtained, and x indicates the case where an aggregate including coarse cells or internal cavities was obtained. Regarding the product appearance, ○ indicates the case where no silver streak was observed, Δ indicates the case where silver streaks were observed to some extent, and x indicates the case where many silver streaks were observed or surface transfer property was poor. The plasticization capability of chemical foam molding was compared relatively where the plasticization capability in Comparative example 4 was assumed to be 1. The state of foaming of the molded product cell layer produced in Example 1 was an aggregate of fine foam cells having desired bubble density and bubble diameter. Swirl marks were few (although silver streaks were observed to some extent) and, therefore, the state of appearance was also good. Since the mixture type of sodium bicarbonate and citric acid was used as the bubble-core-forming agent and air was used as the foaming gas, no harmful decomposition product was generated during molding. Consequently, a molded foam product of the thermoplastic resin not containing residual harmful decomposition product could be obtained.

Examples 2 to 6

Conditions were set as in Example 1 except that the type of infusion gas, the infusion gas pressure, the clamping force releasing rate, the clamping-force-released state maintenance time, the expansion rate (mold-releasing rate), and the foaming magnification were changed to the values shown in Table 1. The results thereof are shown in Table 1.

Regarding the units in Table 1, the infusion gas pressure is in [MPa], the clamping force releasing rate is in [KN/sec], the clamping-force-released state maintenance time is in [sec], and the expansion rate (mold-releasing rate) is in [mm/sec].

Comparative Examples 1 to 4

Conditions were set as in Example 1 except that the type of infusion gas, the infusion gas pressure, the clamping force releasing rate, the clamping-force-released state maintenance time, the expansion rate (mold-releasing rate), and the foaming magnification were changed to the values shown in Table 2. In particular, in contrast to Example 1, the clamping-force-released state maintenance time was set at 0 sec, and the mold cavity was expanded immediately after the clamping force was released, not maintained for a predetermined period of time. The results thereof are shown in Table 2.

TABLE 2

|  | Comparative example 1 | Comparative example 2 | Comparative example 3 | Comparative example 4 |
|---|---|---|---|---|
| Type of infusion gas | $CO_2$ | $N_2$ | $N_2$ | chemical foaming agent |
| Infusion gas pressure | 8.0 | 8.0 | 8.0 | — |
| Clamping force releasing rate | 1000 | 1000 | 1500 | 1000 |
| Clamping-force-released state maintenance time | 0 | 0 | 0 | 0 |
| Expansion rate | 12 | 12 | 0.5 | 12 |
| Foaming magnification | 3.0 | 3.1 | 2.4 | 1.7 |
| State of foaming | x | x | Δ | Δ |
| Product appearance | x | x | x | ○ |
| Plasticization capability | 0.4 | 0.4 | 0.4 | 1.0 |

Regarding the units in Table 2, the infusion gas pressure is in [MPa], the clamping force releasing rate is in [KN/sec], the

TABLE 1

|  | Example 1 | Example 2 | Example 3 | Example 4 | Example 5 | Example 6 |
|---|---|---|---|---|---|---|
| Type of infusion gas | $CO_2$ | $CO_2$ | $N_2$ | $CO_2$ | $N_2$ | compressed air |
| Infusion gas pressure | 8.0 | 8.0 | 8.0 | 0.9 | 0.9 | 0.7 |
| Clamping force releasing rate | 1000 | 1500 | 1000 | 1000 | 1000 | 1000 |
| Clamping-force-released state maintenance time | 4 | 2 | 4 | 4 | 4 | 4 |
| Expansion rate | 2 | 4 | 1 | 2 | 1 | 2 |
| Foaming magnification | 3.3 | 3.0 | 3.4 | 2.3 | 2.4 | 2.2 |
| State of foaming | ○ | ○ | ○ | ○ | ○ | ○ |
| Product appearance | Δ | Δ | Δ | ○ | ○ | ○ |
| Plasticization capability | 0.4 | 0.4 | 0.4 | 0.8 | 0.8 | 0.8 | clamping-force-released state maintenance time is in [sec], and the expansion rate (mold-releasing rate) is in [mm/sec].

INDUSTRIAL APPLICABILITY

The method for injection foaming molding of a thermoplastic resin according to the present invention is suitably used in various industrial fields in which injection-molded foam products of thermoplastic resins exhibiting excellent physical properties such as lightweight properties, heat insulating properties, sound absorbing properties, rigidity on a unit mass basis are required.

The invention claimed is:

1. A method for injection foaming molding of a thermoplastic resin to foam-mold a foaming-agent-containing plasticized resin, in which a foaming agent is blended into a plasticized thermoplastic resin, by using an injection apparatus for injecting the foaming-agent-containing plasticized resin and a mold, in which the foaming-agent-containing plasticized resin injected from the injection apparatus is filled into a mold cavity with a variable volume and by expanding the mold cavity filled with the foaming-agent-containing plasticized resin, the method comprising the following steps (1) to (5):
(1) injecting the foaming-agent-containing plasticized resin from the injection apparatus to fill the mold cavity in a mold-clamped state, the foaming-agent-containing plasticized resin contains a bubble-core forming agent and a foaming gas, with the foaming gas being a member selected from the group consisting of air, carbon dioxide gas, nitrogen gas and mixtures thereof;
(2) releasing a clamping force of the mold immediately after the foaming-agent-containing plasticized resin is injected and filled into the mold cavity, so as to release the pressure of the foaming-agent-containing plasticized resin in the mold cavity;
(3) maintaining the pressure-released state of the foaming-agent-containing plasticized resin in the mold cavity for a predetermined period of time;
(4) expanding the mold cavity to foam the foaming-agent-containing plasticized resin; and
(5) cooling and maintaining the foaming-agent-containing plasticized resin while the mold cavity is in the expanded state.

2. The method for injection foaming molding of a thermoplastic resin according to claim 1, wherein the rate of releasing the clamping force of the mold (clamping force releasing rate) in the step (2) is specified to be 1,000 to 20,000 KN/sec.

3. The method for injection foaming molding of a thermoplastic resin according to claim 1, wherein the predetermined period of time for maintaining the clamping-force-released state of the mold (clamping-force-released state maintenance time) in the step (3) is specified to be 0.1 to 10 seconds.

4. The method for injection foaming molding of a thermoplastic resin according to claim 1, wherein the rate of expanding the mold cavity (expansion rate) in the step (4) is specified to be 0.01 to 10 mm/sec.

5. The method for injection foaming molding of a thermoplastic resin according to claim 1, wherein the foaming agent is blended into the thermoplastic resin by using the foaming gas as the foaming agent and supplying the foaming gas into the injection apparatus at a pressure of 0.1 MPa or more, and below 1.0 MPa so as to allow the foaming gas to contact with the thermoplastic resin, which is present in the injection apparatus and which is before plasticization or after plasticization.

* * * * *